United States Patent

Schumacher et al.

[11] Patent Number: 5,964,812
[45] Date of Patent: Oct. 12, 1999

[54] EVAPORATIVE EMISSIONS LEAK DETECTION SYSTEM AND METHOD UTILIZING ON-VEHICLE DYNAMIC MEASUREMENTS

[75] Inventors: Darren Schumacher, Ypsilanti; Marvin Lynch, Detroit; Donald J. Remboski, Jr., Dearborn, all of Mich.

[73] Assignee: Motorola Inc., Schaumburg, Ill.

[21] Appl. No.: 09/022,739

[22] Filed: Feb. 12, 1998

[51] Int. Cl.[6] .................................................. G01M 17/00
[52] U.S. Cl. ............................ 701/31; 73/49.7; 73/118.1
[58] Field of Search ................................. 701/29, 31, 34, 701/36; 123/518, 519, 520; 73/118.1, 49.1, 49.2, 49.7

[56] References Cited

U.S. PATENT DOCUMENTS

| | | | |
|---|---|---|---|
| 5,146,902 | 9/1992 | Cook et al. | 123/519 |
| 5,297,529 | 3/1994 | Cook et al. | 123/520 |
| 5,606,121 | 2/1997 | Blomquist et al. | 73/118.1 |
| 5,641,899 | 6/1997 | Blomquist et al. | 73/118.1 |
| 5,692,480 | 12/1997 | Kato et al. | 123/519 |
| 5,817,925 | 10/1998 | Cook et al. | 73/49.7 X |
| 5,868,120 | 2/1999 | Van Wetten et al. | 123/518 |

*Primary Examiner*—William A. Cuchlinski, Jr.
*Assistant Examiner*—Ed Pipala
*Attorney, Agent, or Firm*—Nicholas C. Hopman; Gary J. Cunningham

[57] ABSTRACT

A system and method of detecting a leak in an evaporative emissions system for a vehicle includes measuring a physical disturbance of the vehicle with a sensory system and providing a sensory signal (311, 313, 315). Then, comparing the sensory signal (311, 313, 315) to a threshold (405) and generating a diagnosis signal (407, 413) having a "valid test" state, when the sensory signal does not exceed the threshold, and generating the diagnosis signal having an "invalid test" state, when the sensory signal exceeds the threshold. And, executing an evaporative emissions system leak test while the provided diagnosis signal indicates the "valid test" state, and aborting the evaporative emissions system leak test (505) when the diagnosis signal indicates the "invalid test" state.

7 Claims, 4 Drawing Sheets

EVAPORATIVE EMISSIONS LEAK DETECTION SYSTEM AND METHOD UTILIZING ON-VEHICLE DYNAMIC MEASUREMENTS

FIELD OF THE INVENTION

This invention is generally directed to the field of vehicular emissions control and in particular to the prevention of the erroneous detection of leaks in an evaporative emissions system.

BACKGROUND OF THE INVENTION

Contemporary vehicles including passenger cars, light duty trucks, and medium duty vehicles use evaporative emissions systems to prevent unnecessary emission of hydrocarbon (HC) vapors into the atmosphere. These emissions are primarily composed of gasoline vapors leaking from a vehicle's fuel tank to the air. In a typical system, the fuel tank is periodically vented into a canister filled with charcoal that filters the HC vapors and releases the filtered air to the atmosphere. The charcoal traps the hydrocarbon molecules from the polluting vapors, preventing them from leaking to the atmosphere.

Near term emissions regulation requires the monitoring of the vehicle's evaporative emission system to ensure integrity of operation. This requirement specifies, among other things, checking of the absence of leaks in the system. More specifically, the California Air Resources Board, CARB, specifies in their proposed On Board Diagnostic II, (OBD II) requirement to check the evaporative emissions system for leaks. This requires detecting system leaks equivalent to an orifice larger than 0.020 inches in diameter for vehicles produced in model year 2000.

Most prior art schemes for leak detection in an evaporative emissions system utilize a measurement of pressure internal to the fuel tank in order to detect a leak. These measurements are typically made over a period of time on the order of two minutes (one-hundred and twenty seconds) or more.

The prior art leak detection schemes, however, are particularly susceptible to large fluctuations in the fuel tank pressure caused by road load disturbances or violent driver inputs to the vehicle itself. For example, pot holes and railroad tracks can apply powerful impulses to a vehicle's suspension system. Furthermore, cobblestone streets or even rough pavement can excite the vehicle suspension for an extended period of time. These types of road load disturbances can cause a pressure measurement based leak detection system to make a faulty diagnosis by artificially raising or lowering the fuel tank pressure. For example, rocking a warm car on a warm day with high RVP fuel will cause tank pressure to rise faster than without the added suspension excitement. For a car with a cold fuel tank, sloshing fuel can actually be chilled by the cold tank walls, lowering vapor generation and keeping tank pressure artificially low. Misdiagnosis is a serious problem, as failing to properly diagnose a fault can result in a CARB mandated recall, while diagnosing a compliant system as having a leak will drive up OEM warranty costs.

What is needed is an improved method of detecting a leak in an evaporative emissions system for a vehicle that is more accurate than prior art schemes due to the system's ability to prevent road load disturbances or violent vehicle maneuvering from causing erroneous detection or non-detection of leaks.

DETAILED DESCRIPTION OF A PREFERRED EMBODIMENT

The herein described structure overcomes the deficiencies of the prior art by utilizing information provided by various on-vehicle sensory systems to determine whether or not a leak detection test should be performed, or present results invalidated. These on-vehicle sensor systems effectively measure physical perturbations of the vehicle and can include Anti-Skid Braking System (ABS) sensors; active suspension accelerometer(s), a fuel tank pressure sensor, or any combination of the aforementioned sensors. Output from these sensory systems are analyzed, and if statistical or mathematical properties of the output of these sensory systems are found to be unacceptable, then the leak detection test is voided and no diagnosis is made. Restated, the leak detection system is permitted to make a diagnosis of the evaporative emissions system only if the diagnosis indicates that the vehicle is not accelerated by an amount inconsistent with accurate leak detection during the leak detection test.

Figure 1:
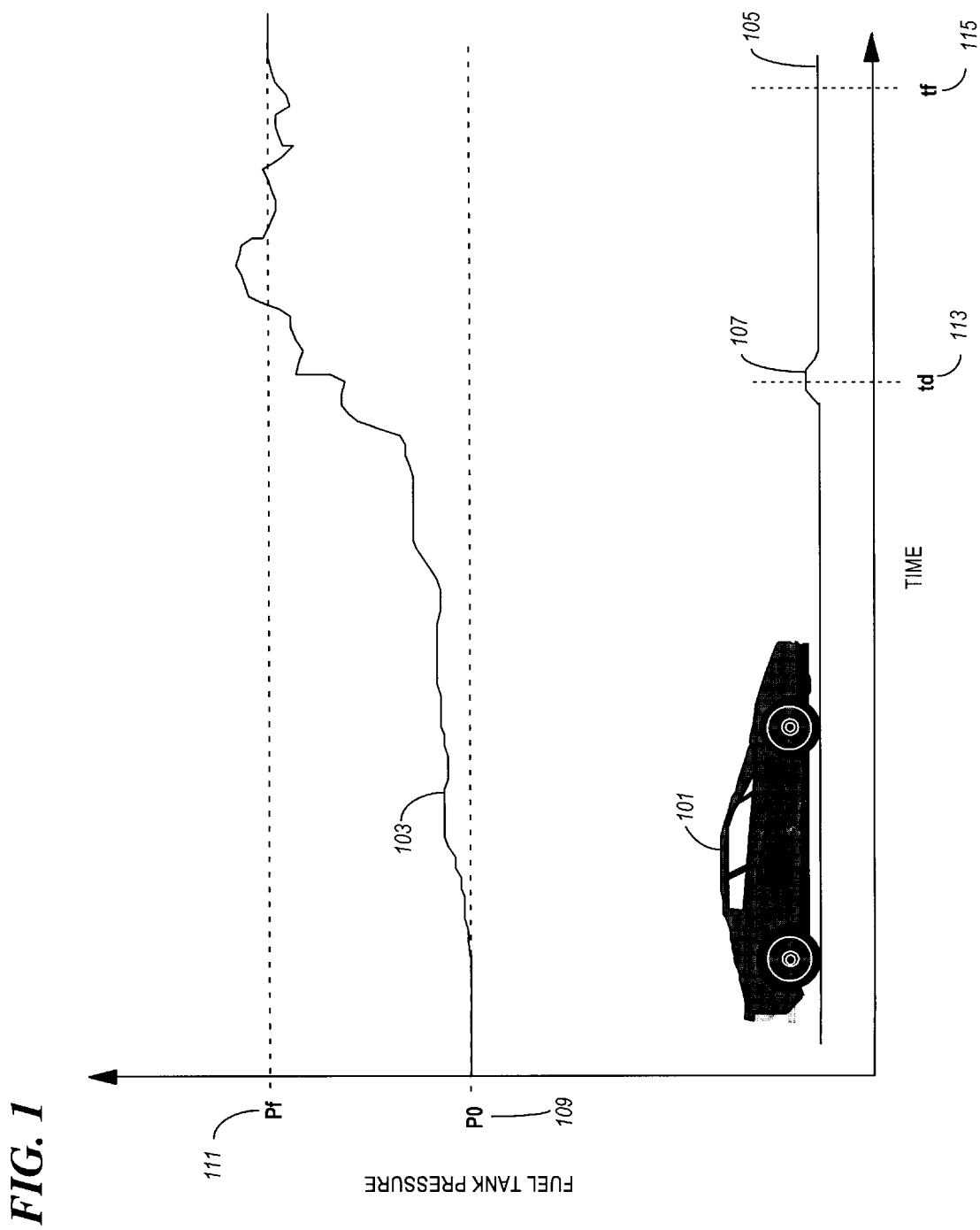
FIG. 1 is a graph of fuel tank pressure versus time for a typical vehicle configuration perturbed by various road load inputs.

The limitations of the prior art leak detection schemes are demonstrated by FIG. 1. Consider a vehicle 101 traveling along a road surface 105. An on-vehicle leak detection system (internal to vehicle 101) ascertains the presence/absence of a leak by measuring the deviation from an initial fuel tank pressure P0 109 over a predetermined amount of time. The fuel tank pressure 103 shows that the fuel tank pressure is rising slightly but not at a particularly large rate. Vehicle 101 continues to travel along road surface 105 until time td 113, where the vehicle strikes an imperfection 107 in road surface 105. Road imperfection 107 applies an impulsive force to the suspension system of vehicle 101, accelerating vehicle 101 in both vertical and horizontal directions. This sudden acceleration of vehicle 101 causes vapor generation in the fuel tank (internal to vehicle 101) as fuel sloshes in response to the sudden acceleration. This fuel motion causes the fuel tank pressure 103 to rise suddenly. At the end of test time tf 115, the final tank pressure Pf 111 is artificially elevated by the acceleration resulting from road surface imperfection 107. This elevated final tank pressure Pf 111 is then fed to a decision algorithm (internal to vehicle 101), and the artificially elevated value may cause an erroneous leak detection result.

The preferred embodiment addresses this issue by examining a signal provided by an ABS system, an active suspension accelerometer, a fuel tank pressure sensor, or any combination of the aforementioned sensors.

Figure 2:
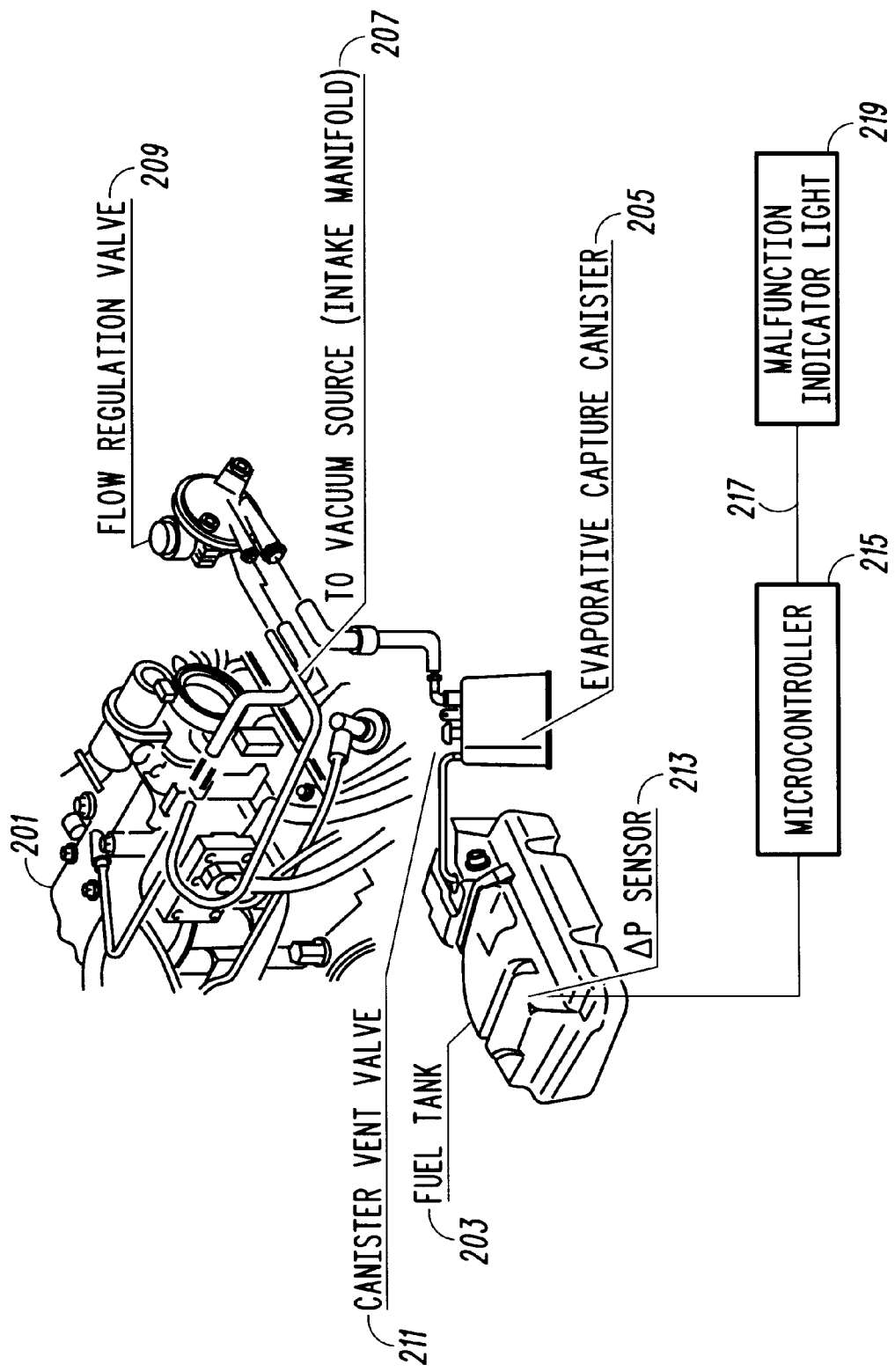
FIG. 2 is a schematic diagram of a reciprocating engine with an evaporative emissions system.

FIG. 2 is a schematic diagram of a reciprocating engine with an evaporative emissions system. An engine 201 is fueled from fuel residing in a fuel tank 203. Because some of the fuel in the fuel tank 203 is in gaseous form it periodically needs to be vented to prevent a dangerous buildup of pressure. While controlling any excessive pressure buildup in the fuel tank 203 it is also vital not to emit hydrocarbons, HCs, to the atmosphere. The pressure internal to fuel tank 203 can be vented using an evaporative emissions system as illustrated here. While the engine 201 is not operating, the fuel tank 203 is vented through the evaporative capture canister 205. When the engine is operating, the captured fuel vapor in the evaporative capture canister 205 is inducted into the engine 201 and burned. Burning the captured fuel vapor is done by inducting the vapor in the evaporative capture canister 205 into the intake manifold 207 of the engine 201 via a flow regulation valve 209.

Note that ΔP as measured by sensor 213 is a differential pressure measured comparing the atmospheric pressure outside the fuel tank 203 with a pressure inside the fuel tank 203. The measured flow rate derived from ΔP is indicative of a vapor generation rate. The next step is to measure the flow rate at another ΔP across the fuel tank 203. This is done by pulling the vacuum on the fuel tank 203 using the engine 201. Next, the two flow measurements are subtracted, the result being indicative of leak flow, so the vapor flow is canceled out. This allows very small leaks to be detected. The ΔP signal provided by pressure sensor 213 is provided to microcontroller 215. Preferably, the microcontroller 215 is constructed using a Motorola 68HC705B6 microcontroller. The Motorola 68HC705B6 microcontroller includes on-vehicle program memory in the form of EPROM (Erasable Programmable Read Only Memory), and an analog to digital converter (internal to microcontroller 215) to interpret a pressure signal from a ΔP sensor 213. This type of microcontroller 215 is easily constructed by those skilled in the art. Various method steps encoded into the controller's program memory then ascertain the presence or absence of n evaporative emissions system leak. If a leak is present, the microcontroller 215 generates a fault indicator signal 217, activating malfunction indicator light (MIL) 219, and thereby indicating that the vehicle 101 should be taken in for service related to an emissions system fault. Microcontroller 215 then stores a record of such a fault in memory internal to microcontroller 215. Note that the microcontroller 215 is connected to the flow regulation valve 209 for coupling the intake manifold 207 to the fuel system, and for measuring the flow generated by the flow regulation valve 209. The microcontroller 215 also manages the canister vent valve 211, and measures the ΔP across the fuel tank 203 via the pressure sensor 213.

ABS technology is widely known in the prior art. The relevant attribute of an ABS here is that an ABS can provide a measurement or estimate of wheel acceleration. This acceleration can then be used to infer the presence of a road load disturbance or a disturbance due to other vehicle motion.

Active suspension system technology is also widely known in the prior art. The relevant attribute of an active suspension system is that an active suspension system can provide a measurement or estimate of vehicle body acceleration (usually through the use of accelerometers). This acceleration can then be used to infer the presence of a road load disturbance or a disturbance due to other vehicle motion.

Alternatively, a dedicated sensor such as a vehicle body accelerometer may be placed on the vehicle in order to provide a measurement of vehicle body acceleration. Alternatively, a pressure sensor may be placed inside the fuel tank in order to provide a direct measurement of fuel tank pressure.

Figure 3:
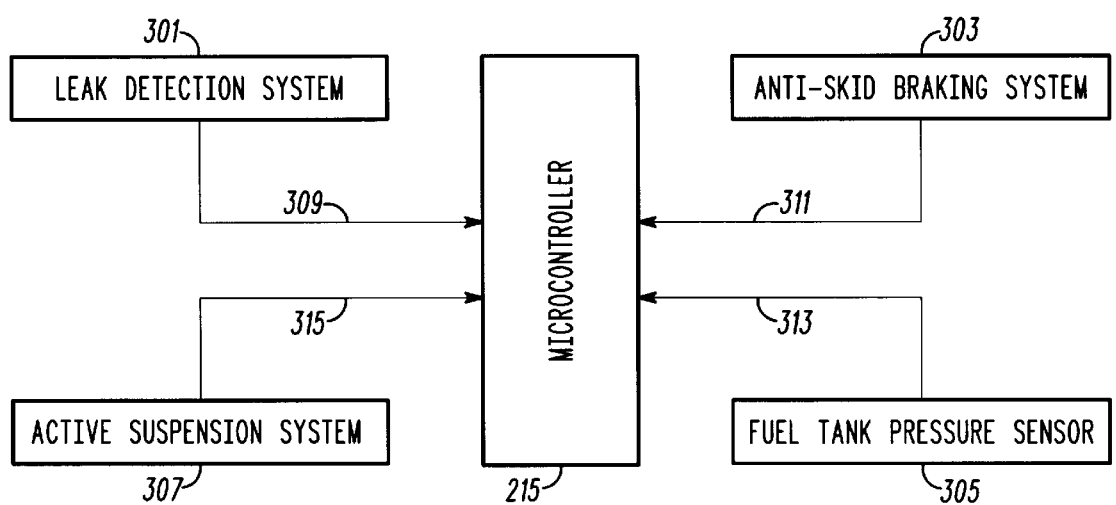
FIG. 3 is a block diagram of a vehicle system including an ABS, an active suspension system, a leak detection system, a fuel tank pressure sensor, and a microcontroller.

FIG. 3 is a block diagram of a vehicle system including an ABS, an active suspension system, a leak detection system, a fuel tank pressure sensor, and a microcontroller. A leak detection system 301 sends sensor signals 309 to a microcontroller 215. The microcontroller 215 utilizes sensor signals 309 in an algorithm internal to microcontroller 215 which determines the absence/presence of a leak in the evaporative emissions system. Concurrent with a leak detection test, ABS 303 supplies a wheel acceleration signal 311 to the microcontroller 215. Concurrent with the leak detection test, fuel tank pressure sensor 305 supplies fuel tank pressure signal 313 to microcontroller 215. Concurrent with the leak detection test, active suspension system 307 supplies body acceleration signal 315 to microcontroller 215. The microcontroller 215 utilizes body acceleration signal 315, fuel tank pressure signal 313, and wheel acceleration signal 311 in order to create a diagnosis signal (internal to microcontroller 215). Note that the diagnosis signal has two states a "valid test" and a "invalid test" state. As stated earlier, the leak detection system is permitted to make a diagnosis of the evaporative emissions system only if the diagnosis signal indicates that the vehicle is not accelerated by an amount inconsistent with accurate leak detection during the leak detection test. Next, a preferred method will be detailed.

Figure 4:
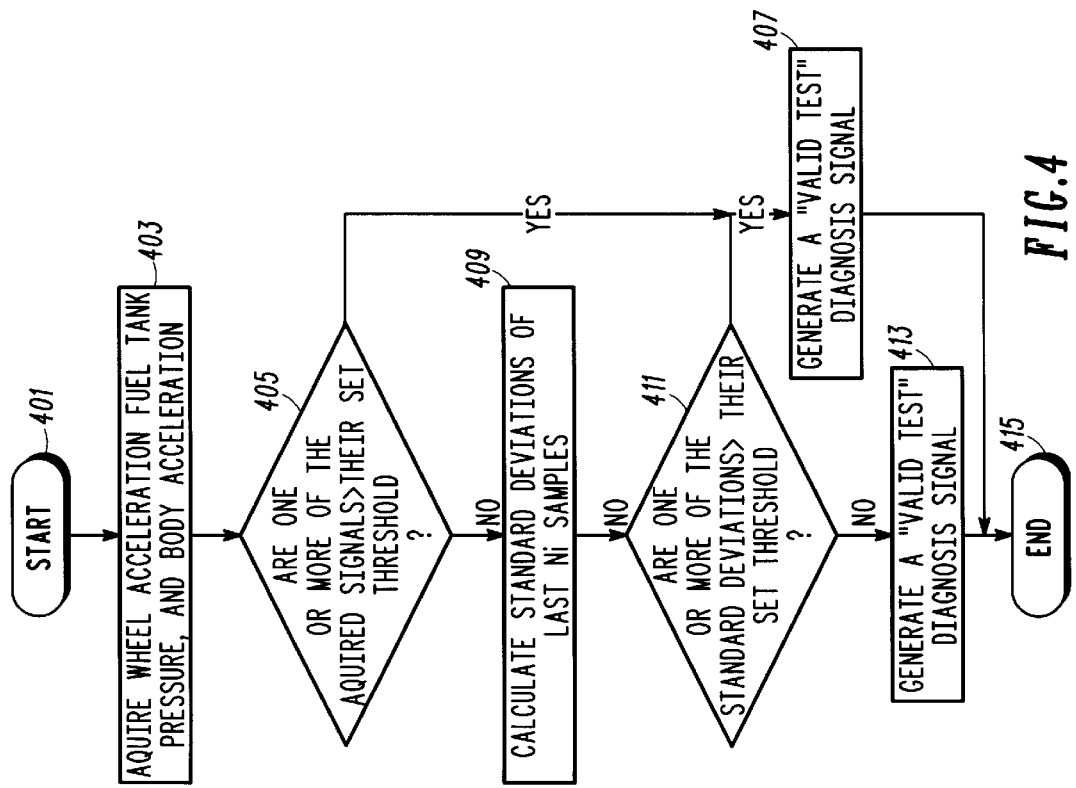
FIG. 4 is a flow chart demonstrating the steps executed during the detection of a leak necessary to generate an invalid/valid diagnosis signal in accordance with a preferred embodiment of the invention.

FIG. 4 is a flow chart demonstrating the steps executed during the detection of a leak in accordance with a preferred embodiment of the invention. For the preferred embodiment, these steps are executed internal to the microcontroller 215, but alternative embodiments, such as a dedicated circuit, can be employed without departing from the fundamental teaching of this embodiment. Furthermore, although the preferred embodiment utilizes pressure signals from inside the fuel tank, wheel acceleration signals, and vehicle body accelerations signals, other alternative embodiments can be constructed by one of ordinary skill in the art, such as the removal of one or more of the aforementioned signals. The method begins at a start step 401.

Next, in step 403, the body acceleration signal 315, the fuel tank pressure signal 313, and the wheel acceleration signal 311 are acquired.

Then, in step 405 the body acceleration signal 315, the fuel tank pressure signal 313, and the wheel acceleration signal 311 are individually compared to respective threshold values. If one or more of the body acceleration signal 315, the fuel tank pressure signal 313, and the wheel acceleration signal 311 is greater than its respective threshold, then control is passed to step 407. Note that the thresholds are calibratable, and can vary depending on the vehicle's physical configuration.

In step 407 an "invalid test" diagnosis signal is generated indicating that there is too much physical disturbance to the vehicle to expect a valid leak test to be executed. The method then branches to an end step 415.

In step 405, if none of the body acceleration signal 315, the fuel tank pressure signal 313, and the wheel acceleration signal 311 is greater than its respective threshold, then step 409 is executed.

In step 409 a standard deviation of the body acceleration signal 315 over the last $N_1$ samples is calculated, the standard deviation of the fuel tank pressure signal 313 over the last $N_2$ samples is calculated, and the standard deviation of the wheel acceleration signal 311 over the last $N_3$ samples is calculated, where $N_1$ $N_2$ and $N_3$ are calibratable parameters.

Then, in step 411, the standard deviations just calculated are individually compared to threshold values associated with each of the sensory systems 303, 305, 307, which are again calibratable. If one or more of the standard deviations exceeds its respective threshold, then step 407 is executed. If in step 411, the standard deviation of the body acceleration signal 315, the standard deviation of the fuel tank pressure signal 313, and the standard deviation of the wheel acceleration signal 311 are all individually less than or equal to their respective thresholds, then step 413 is executed.

In step 413 the microcontroller 215 generates a "valid test" diagnosis signal, and the method ends at step 415. Note that the process just described is executed continuously during the execution of a leak detection test.

Figure 5:
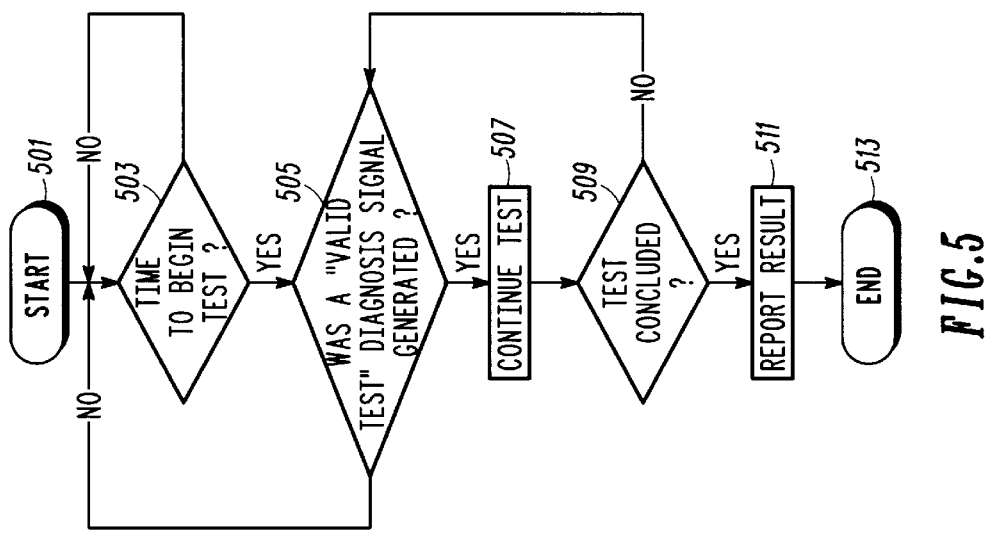
FIG. 5 is a flow chart demonstrating the steps executed in utilizing the aforementioned invalid/valid diagnosis signal in interrupting/not interrupting a leak detection test in accordance with a preferred embodiment of the invention.

FIG. 5 is a flow chart demonstrating the steps executed in utilizing the aforementioned "valid test"/"invalid test" signal. The method commences at a start step 501.

Next, in step 503 the microcontroller 215 determines whether or not to begin a leak detection test. When the microcontroller 215 determines that a leak detection test is to begin, then step 505 is executed.

In step 505, the test diagnosis signal generated during the execution of step 407 or step 413 is examined. If the test diagnosis signal indicates an "invalid test", then the method returns to step 503. If the test diagnosis signal indicates a "valid test", then step 507 is executed.

In step 507 the microcontroller 215 continues to execute the leak detection test.

Next, in step 509, the microcontroller checks whether or not the leak detection test has concluded. If, during the execution of step 509, microcontroller 215 determines that the leak detection test has not concluded, then the method returns to step 505. If, during the execution of step 509, microcontroller 215 determines that the leak detection test has concluded, then step 511 is executed.

In step 511 the microcontroller 215 reports the result of the leak detection test, either indicating that the system does not contain a leak, or, in the case of detecting a leak, generating a fault indicator signal 217, thereby activating the malfunction indicator light 219. The method then terminates in step 513.

The above-described approach overcomes problems of erroneous diagnosis of leaks in evaporative emissions systems by utilizing information from on-vehicle sensors to ensure that the test results are valid. This improved system and method of detecting a leak in an evaporative emissions system is more accurate than prior art schemes due to the system's ability to prevent road load disturbances or violent vehicle maneuvering from causing erroneous detection or non-detection of leaks.

What is claimed is:

1. A method of detecting a leak in an evaporative emissions system for a vehicle, the method comprising the steps of:

establishing a threshold;

measuring a physical disturbance of the vehicle with a sensory system and providing a sensory signal;

comparing the sensory signal to the threshold and generating a diagnosis signal having a "valid test" state, when the sensory signal does not exceed the threshold, and generating the diagnosis signal having an "invalid test" state, when the sensory signal exceeds the threshold; and executing an evaporative emissions system leak test while the provided diagnosis signal indicates the "valid test" state, and aborting the evaporative emissions system leak test when the diagnosis signal indicates the "invalid test" state.

2. A method in accordance with claim 1 further comprising the steps of:

calculating a standard deviation of the sensory signal measured by the sensory system and then generating the "valid test" state, and an "invalid test" state, dependent thereon.

3. A method in accordance with claim 2 further comprising the steps of:

setting another threshold; and wherein the step of calculating a standard deviation of the sensory signal comprises calculating a standard deviation of the sensory signal measured by the sensory system and then generating the "invalid test" state when the standard deviation exceeds the another threshold.

4. A method of detecting a leak in an evaporative emissions system for a vehicle, the method comprising the steps of:

establishing a threshold;

measuring a physical disturbance of the vehicle with a sensory system and providing a sensory signal;

comparing the sensory signal to the threshold and generating a diagnosis signal having a "valid test" state, when the sensory signal does not exceed the threshold, and generating the diagnosis signal having an "invalid test" state, when the sensory signal exceeds the threshold;

setting another threshold;

calculating a standard deviation of the sensory signal measured by the sensory system and then modifying the diagnosis signal to provide the "valid test" state, and an "invalid test" state, dependent on the another threshold; and executing an evaporative emissions system leak test while the provided diagnosis signal indicates the "valid test" state, and aborting the evaporative emissions system leak test when the diagnosis signal indicates the "invalid test" state.

5. A system for detecting a leak in an evaporative emissions system of a vehicle, the system comprising:

a sensory system for measuring a physical disturbance of the vehicle and providing a sensory signal; and a device for comparing the sensory signal to a threshold and generating a diagnosis signal having a "valid test" state, when the sensory signal does not exceed the threshold, and generating the diagnosis signal having an "invalid test" state, when the sensory signal exceeds the threshold, the device further executing an evaporative emissions system leak test while the provided diagnosis signal indicates the "valid test" state, and aborting the evaporative emissions system leak test when the diagnosis signal indicates the "invalid test" state.

6. A system in accordance with claim 5 wherein the device further comprises:

means for calculating a standard deviation of the sensory signal measured by the sensory system and then generating the "valid test" state, and an "invalid test" state, dependent thereon.

7. A method in accordance with claim 6 wherein the device further comprises:

means for setting another threshold; and wherein means for calculating the standard deviation of the sensory signal comprises means for calculating a standard deviation of the sensory signal measured by the sensory system and then indicating the "invalid test" state when the standard deviation exceeds the another threshold.

* * * * *